3,340,070
ARTIFICIAL SWEETENING AGENT
Richard J. Windgassen, Berkeley, Calif., assignor to Shell Oil Company, New York, N.Y., a corporation of Delaware
No Drawing. Filed Aug. 23, 1963, Ser. No. 304,272
3 Claims. (Cl. 99—141)

This invention relates to the sweetening of foods and other products in which a sweet taste is desirable and is not provided by the food or other product itself, for according to this invention, it has been found that 5,5-dimethyl-4-iminohydantoin melting point 280–283° C. (dec.), is intensely sweet, with physical, chemical and other biological properties such that it is useful for the sweetening of such materials.

The sweetening agent of this invention has the formula

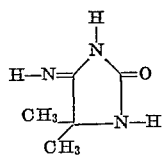

It melts at 280–283° C. (with decomposition), and also can be named as 5-imino-4,4-dimethyl-2-imidazolidinone.

It also has been found that sweetness is a unique characteristic of this compound, inasmuch as closely related compounds such as the following have been found not to be sweet:

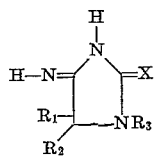

(1) $R_1$, $R_2$, $R_3$=$CH_3$; X=O;
(2) $R_1$=$CH_3$; $R_2$=$C_2H_5$; $R_3$=H; X=O;
(3) $R_1$, $R_2$=—$(CH_2)_5$—; $R_3$=H; X=O;
(4) $R_1$, $R_2$=$CH_3$; $R_3$=H; X=S.

Another related compound ($R_1$=phenyl; $R_2$, $R_3$=H; X=O) was found to be definitely bitter.

This 5,5-dimethyl-4-iminohydantoin is readily prepared by reacting alpha-ureidoisobutyronitrile (1-cyanoisopropylurea) (Biltz and Slotta, J. Prakt. Chem., 113, 233 (1926) shows its preparation), with hydrogen in liquid ammonia using Raney nickel-chromium catalyst.

The sweetness of this compound was established as follows: a panel of four men was used. Solutions of 0.1%, 0.01%, 0.001% and 0.0001% of 5,5-dimethyl-4-iminohydantoin, in water, were tested against 2% sucrose solution. The sweetness of the sucrose solution was found to lie between the sweetness of the 0.1% and 0.01% solutions of the sweetener, indicating that the sweetener had between 20 and 200 times the sweetness of sucrose (weight basis). It was the conclusion of the panel that the sweetener probably was from 50 to 100 times as sweet as sucrose. No undesirable after-taste was found.

5,5-dimethyl-4-iminohydantoin can be used safely for sweetening foods and other materials that are ingested. Thus, no ill effects were noted by any of the persons who ascertained this compound to be sweet. Further, mice dosed with the compound (by syringe into the digestive tract) at the dosage of 500 milligrams per kilogram of body weight exhibited no ill effects.

5,5-dimethyl-4-iminohydantoin is readily soluble in water (12.5 grams dissolves in 100 grams of water at room temperature, 22° C.), and is stable, with apparently adequate stability even in aqueous solution under acid conditions such as would exist in carbonated beverages.

Accordingly, 5,5-dimethyl-4-iminohydantoin is an effective sweetening agent, useful particularly in cases where sweetness is desired but where it is not possible or is not desirable to use sugars, syrups or other natural sweetening agents—as in cases where the high caloric value of such natural sweetening agents precludes their use. As has already been indicated, it can be used to sweeten any material which is itself not sweet, or is insufficiently sweet, including materials to be consumed, as well as materials that which will merely contact the lips, mouth and/or tongue of a user. Typical materials to be consumed include all manner of foodstuffs, including fresh, cooked, dried, canned, candied or frozen fruits, vegetables, juices thereof, purees, jam, jellies, marmalades and the like; meat products, dairy products, including both frozen products as ice creams, ice milks, sherbets and the like, and non-frozen products such as custards, puddings and the like (and including prepared mixes); bakery goods (and prepared mixes); candies and confections and confectionery products such as toppings, fillings, flavors, syrups and the like (including prepared mixes); beverages, including wines and other liquors, carbonated and non-carbonated soft drinks, tea, coffee, cocoa and the like (including prepared mixes); pickling brines; dressings, such as mayonnaises, salad dressings, and the like; cough syrups, elixirs, pills, tablets and other medical preparations designed to be taken orally, including coatings from such preparations to disguise undesirable flavors, and the like. The compound also may be used to sweeten materials and objects which merely contact oral surfaces, such as dental preparations: toothpastes, powders, mouth washes, denture cleaners, denture adhesives, other adhesives, such as gums for stamps, envelopes, labels, and the like.

The sweetener can be incorporated in the material to be sweetened in any of the usual ways: by simply mixing the sweetener with the material, or by first dissolving the sweetener in a suitable solvent or suspending it in a suitable liquid medium, then mixing the solution or suspension with the material to be sweetened, or by mixing the sweetener with a suitable solid carrier. Since but a small amount of the sweetener ordinarily is required to impart the desired sweetness, it often will be most convenient to first formulate the sweetener with the suitable carrier, then mix the formulation with the material to be sweetened. As diluent there may be used any of the usual liquid and solid pharmaceutical carriers, including water, glycerol, starch, sorbitol, salt, sugar, citric acid, vegetable oils, and the like, which is nontoxic and compatible with the material which is to be sweetened.

The concentration of the sweetener in the formulation is not critical, and is chosen as appropriate for the intended purpose. Suitable formulations can contain as little as 1% by weight of the sweetener, but ordinarily it will be found convenient to have at least 3% by weight, of the sweetener present. On the other hand, concentrates may contain 10% or even more of the sweetener.

Since the sweetener is intensely sweet, but very small amounts of it are needed to impart the desired sweetness, with the amount in any case being dependent upon the taste preferences of the consumer, taking into account the character of the material to be sweetened.

Ordinarily, the desired sweetness is imparted by the addition of less than about 1% of the sweetener, based on the weight of the material to be sweetened, with less than about 0.5%—for example from about 0.01% to about 0.25%—of the sweetener on the same basis, usually providing the desired sweetness. As little as 0.001% of the sweetener (same basis) often will be sufficient.

I claim as my invention:

1. A method for sweetening a material, which method comprises adding to the material an effective amount of 5,5-dimethyl-4-iminohydantoin, melting at 280–283° C. (dec.).

2. A sweetening composition comprising (1) 5,5-dimethyl-4-iminohydantoin, melting at 280–283° C. (dec.) and (2) a palatable, edible, physiologically non-toxic carrier therefor.

3. A composition comprising (1) a food and as a sweetener, (2) 5,5-dimethyl-4-iminohydantoin, melting at 280–283° C. (dec.).

References Cited

FOREIGN PATENTS 966,395  10/1950  France.

A. LOUIS MONACELL, *Primary Examiner.*

RAYMOND N. JONES, S. E. HEYMAN, *Examiners.*